Patented June 14, 1932

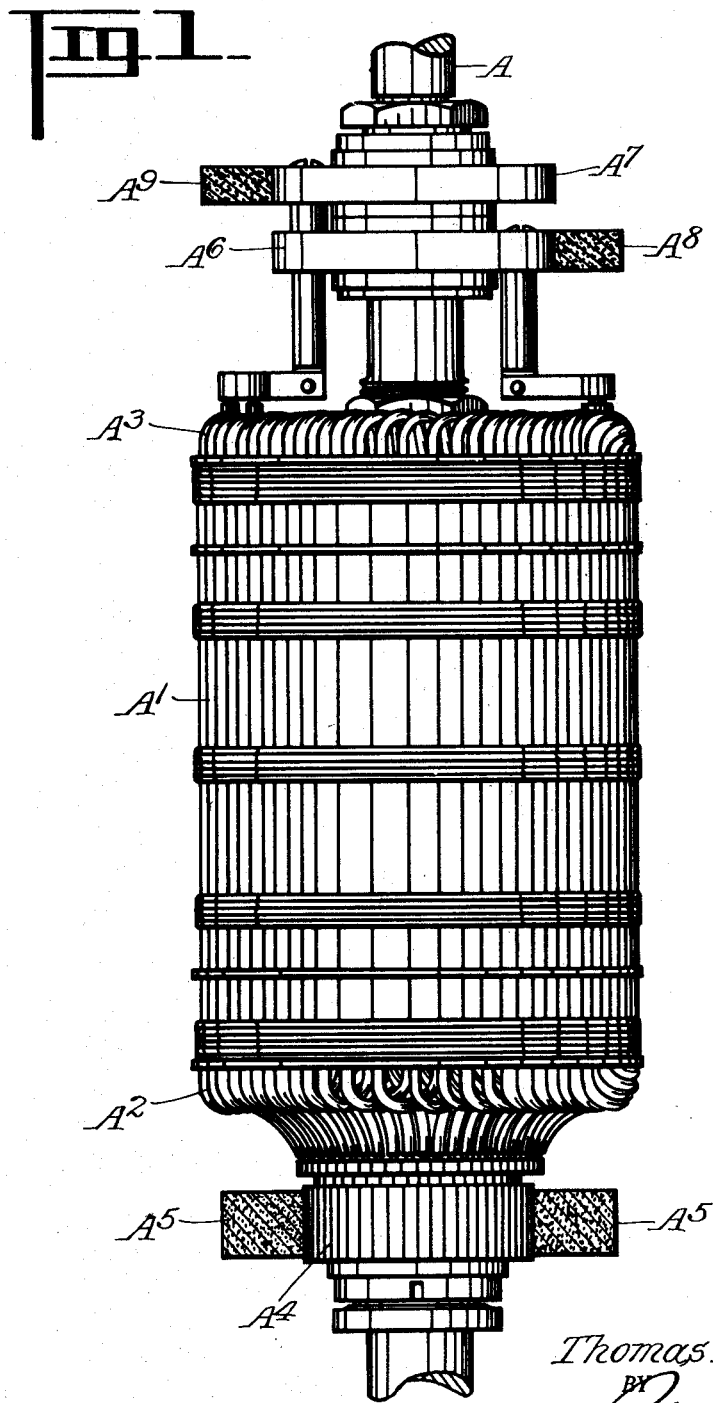

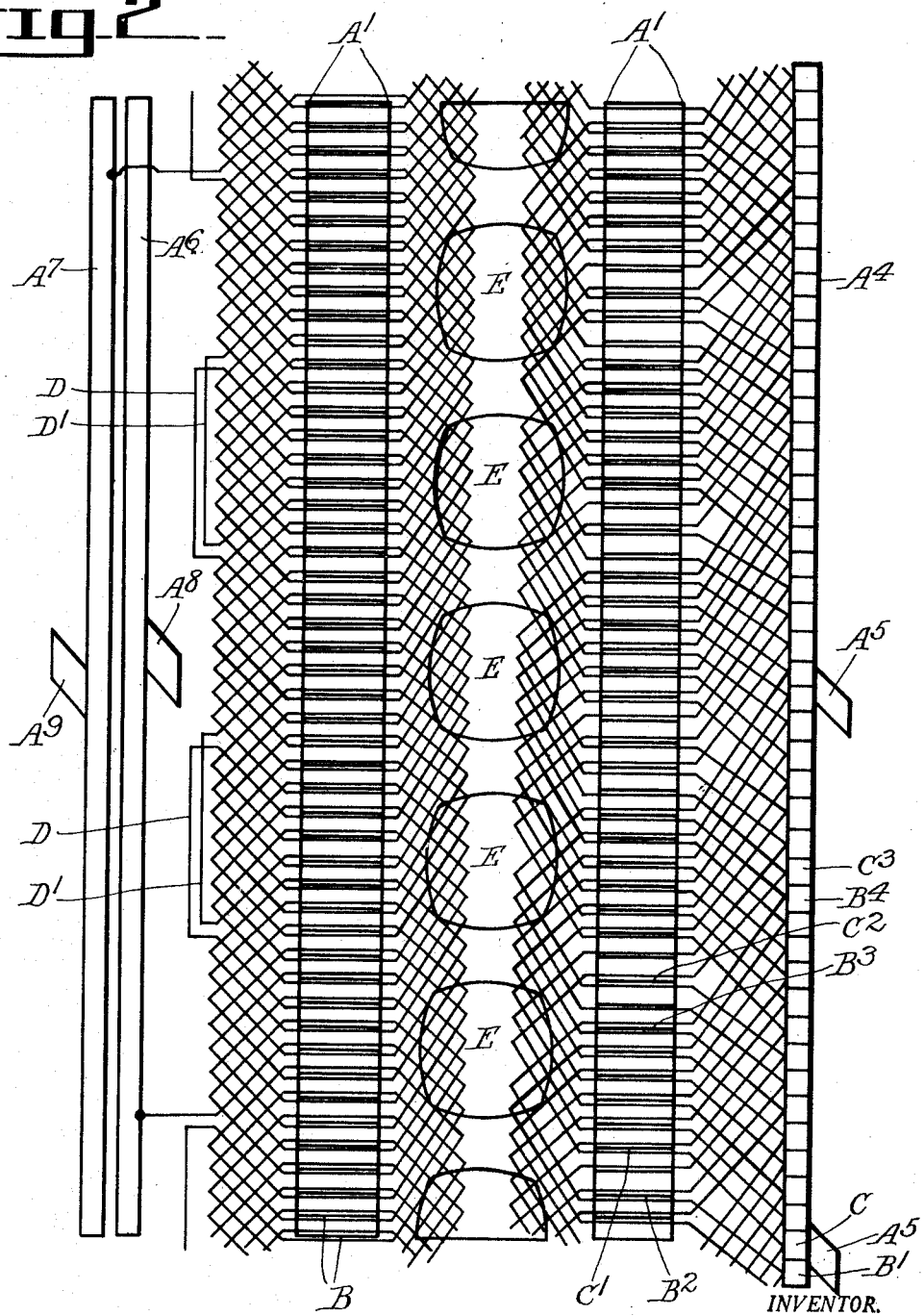

1,862,543

UNITED STATES PATENT OFFICE

THOMAS E. McDOWELL, OF CHICAGO, ILLINOIS, ASSIGNOR TO THE PYLE-NATIONAL COMPANY, OF CHICAGO, ILLINOIS, A CORPORATION OF NEW JERSEY

ELECTRIC MACHINE

Application filed March 20, 1930. Serial No. 437,319.

My invention relates to improvements in electric machine and has for one object to provide a new and improved form of alternate current, direct current generator which is primarily intended for a standby source of power for operation in connection with airway beacons and the like wherein the beacons are ordinarily operated from local 110 volt alternating current source of power. My generator is associated with a gas engine and is adapted to be automatically started when the local power source breaks down, hence in the generator there must be provided windings which will give high tension say 110 volt alternating current to light the beacon and operate motors and control elements which are associated with the beacons. At the same time the generator itself must provide low tension direct current for exciting the field and charging the starting battery and the direct current windings must also be available as a motor to start the engine when the local current is turned off.

My invention is illustrated more or less diagrammatically in the accompanying drawings, wherein—

Figure 1 is a side elevation of the armature only;

Figure 2 is a diagrammatic development of the relation between the armature windings, commutator and slip ring. The details of the structure, pole pieces frame, field coil, etc. are not shown as they form no part of the present invention.

Like parts are indicated by like characters.

A is the armature shaft. It carries a laminated core $A^1$ slotted to carry DC coils $A^2$ and AC coils $A^3$. $A^4$ is the commutator associated with the AC coils $A^2$ in the usual manner and provided with take off brushes $A^5$. $A^6$ $A^7$ are slip rings associated with the AC coils $A^3$ and provided with take off brushes $A^8$ $A^9$. The electric connections to the brushes and the electric controls and the means for driving the generator are not illustrated.

Referring to Figure 2, E E indicates a diagrammatic showing of the six poles of the field. The two pairs of heavy lines parallel with the developed slip rings and commutator in Figure 2 indicate the core $A^1$. As a matter of fact a correct showing in Figure 2 would show the two pairs of heavy lines $A^1$ $A^1$ superposed one on the other but they have been separated so that the AC and DC wiring may be shown side by side.

It will also be understood that the black coarse lines extending between the lines $A^1$ which I have indicated at B are a diagrammatic showing of the core slots and the two winding lines or coil line associated with each line B indicate that ordinarily there are two coils or windings of AC and DC in each core slot.

Referring to the DC showing in Figure 2, it will be noted that some of the core slots have but a single winding while others have two. It will further be noted that the winding is what is called a wave winding. For instance starting with the commutator segment $B^1$, the coil leads to and through a core slot $B^2$ thence forwardly to a core slot $B^3$ and thence to a commutator segment $B^4$ spaced along the periphery.

From the next commutator segment C a coil leads through a core slot $C^1$ which is immediately adjacent the slot $B^2$ through a core slot $C^2$ which is immediately adjacent the slot $B^3$ to the commutator segment $C^3$ which is immediately adjacent the segment $B^4$ and so on. The skipping of occasional core slots having but a single coil is required in this case to give the proper relation between the AC voltage and the DC voltage. If the relation were different it might happen that more or less of the slots were skipped and it might happen that all of the slots would have two coils depending upon the design of the apparatus.

Referring now to the AC side, it will be noted that all the AC coils are in series with the two slip rings instead of as is usually the case in parallel in banks which banks are in series with the slip rings. It will be noted for instance that the coils are arranged in series of eight reversed or cross over by means of the wires D $D^1$ but these coils are all in series, one end of the system terminating at the slip ring $A^6$, the other end at the slip ring $A^7$.

It will be understood that the AC and DC coils are in the same slots. The AC coils are put in first and then the DC coils are put in place. This relation of the DC wave winding and the so to speak lap winding on the DC side results in a motor generator which gives regulation close enough to comply with the exacting standards of the United States Government or service and at the same time produces a sufficiently cheap and durable apparatus so that it may be installed with individual air beacons.

I claim:

1. A self-excited electric machine comprising a slotted armature, a commutator, a pair of slip rings, a wave-winding in the armature slots connected to said commutator, circuit means connecting the commutator to field windings of the machine, an A. C. winding in the armature slots having its ends connected to said slip rings, alternate banks of coils in said A. C. winding being connected in reversed circuit association with the other coils of the winding, coil sides of both windings being positioned in certain armature slots.

2. A self-excited electric machine comprising a slotted armature, a commutator, a pair of slip rings, a wave-winding in the armature slots connected to said commutator, circuit means connecting the commutator to field windings of the machine, an A. C. winding in the armature slots having its ends connected to said slip rings, alternate banks of coils in said A. C. winding being connected in reversed circuit association with the other coils of the winding, coil sides of said wave-winding and said A. C. winding being placed in the same slot with the coil sides of the wave-winding at the bottom of the slot.

Signed at Chicago, county of Cook and State of Illinois, this 15th day of March, 1930.

THOMAS E. McDOWELL.